US008717700B2

(12) United States Patent
Kishino (10) Patent No.: US 8,717,700 B2
(45) Date of Patent: May 6, 2014

(54) CHANNEL CIRCUIT AND SEEK METHOD

(75) Inventor: Keiichi Kishino, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 115 days.

(21) Appl. No.: 13/414,511

(22) Filed: Mar. 7, 2012

(65) Prior Publication Data

US 2013/0003209 A1    Jan. 3, 2013

(30) Foreign Application Priority Data

Jun. 30, 2011   (JP) ................................. 2011-146615

(51) Int. Cl.
*G11B 5/02*    (2006.01)

(52) U.S. Cl.
USPC ................... 360/55; 360/75; 360/46; 360/53

(58) Field of Classification Search
None
See application file for complete search history.

(56) References Cited

U.S. PATENT DOCUMENTS 6,801,982 B2 *  10/2004  Borkenhagen et al. ........ 711/118
6,937,415 B2 *  8/2005   Galbraith et al. ............... 360/53

FOREIGN PATENT DOCUMENTS

| JP | 62-121527 A | 6/1987 |
| JP | 09-81328 A | 3/1997 |
| JP | 2002-244816 A | 8/2002 |

* cited by examiner

*Primary Examiner* — Muhammad N Edun
(74) *Attorney, Agent, or Firm* — Knobbe Martens Olson & Bear LLP (57) ABSTRACT

A channel circuit includes a reader, a decoder, a prediction module, and a seek module. The reader reads data written in a medium. The decoder performs iterative decoding of the read data. The prediction module predicts whether an early read is possible or not without waiting for arrival of the read data. The seek module continuously initiates a seek when the prediction module predicts that the read is possible.

12 Claims, 6 Drawing Sheets

FIG. 6

CHANNEL CIRCUIT AND SEEK METHOD

CROSS REFERENCE TO RELATED APPLICATION(S)

The present disclosure relates to the subject matters contained in Japanese Patent Application No. 2011-146615 filed on Jun. 30, 2011, which are incorporated herein by reference in its entirety.

FIELD

An embodiment of the present invention relates to a channel circuit and a seek method for improving a random read performance by an early seek.

BACKGROUND

There is a need for an early seek of a disk. In particular, in an iterative decoding scheme represented by a low-density parity-check (LDPC) code, a few sectors to tens of sectors of a decoding delay occurs until a desired sector is read and then a read channel transmits data to a hard disk controller (HDC). Accordingly, when continuously reading data present in another zone or cylinder, a controller needs to wait for a decoding delay until a seek for a subsequent destination position is initiated. Accordingly, a random read performance may be degraded.

In relation thereto, for example, JP-A-62-121527 discloses parallel processing of a data transmission between a memory and a buffer, and providing a wrap-around function to a reading/recording operation of the buffer, and performing a serial or parallel processing of a data transmission between a main memory and the buffer even while data is being transmitted between the buffer and the disk, in the seek of the disk.

However, there is a need for a technology capable of improving a random read performance through an early seek.

BRIEF DESCRIPTION OF THE DRAWINGS

A general configuration that implements the various features of the invention will be described with reference to the drawings. The drawings and the associated descriptions are provided to illustrate embodiments of the invention and should not limit the scope of the invention.

DETAILED DESCRIPTION OF THE EMBODIMENTS

According to one embodiment, there is provided a channel circuit including a reader, a decoder, a prediction module, and a seek module. The reader reads data written in a medium. The decoder performs iterative decoding of the read data. The prediction module predicts whether an early read is possible or not without waiting for arrival of the read data. The seek module continuously initiates a seek when the prediction module predicts that the read is possible.

Hereinafter, an exemplary embodiment will be described with reference to FIG. 1 through FIG. 6.

Figure 1:
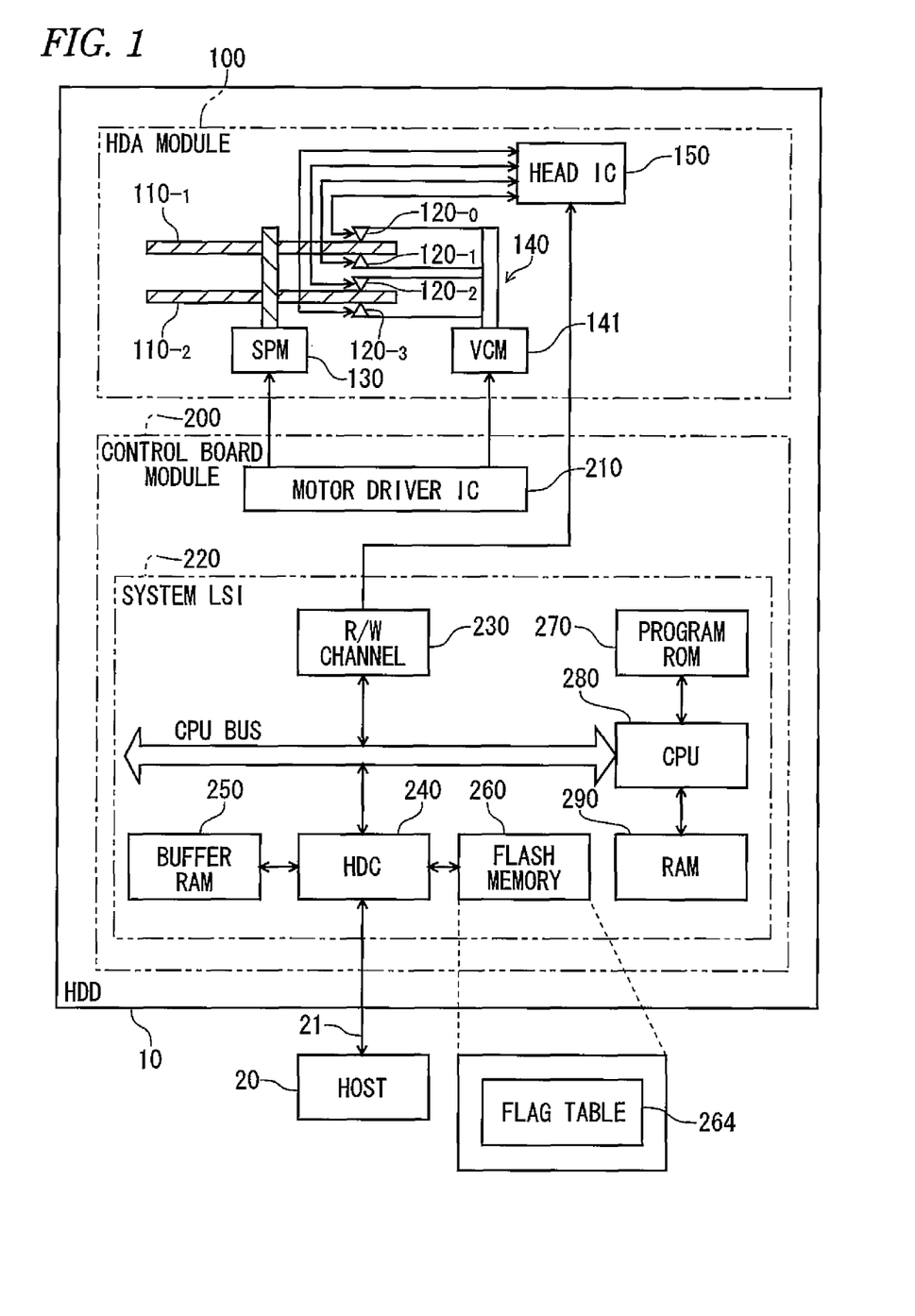
FIG. 1 is a block diagram illustrating a typical configuration of an electronic device including a magnetic disk apparatus according to an embodiment of the present invention.

FIG. 1 is a block diagram illustrating a typical configuration of an electronic device including a magnetic disk apparatus according to the embodiment of the present invention. In FIG. 1, the electronic device includes a magnetic disk apparatus (hard disk drive (HDD)) 10 and a host (host system) 20. The electronic device is, for example, a personal computer (PC), a video camera, a music player, a mobile terminal or a cellular telephone. The host 20 employs the HDD 10 as a storage unit of a corresponding host 20.

The HDD 10 includes a head disk assembly module (HDA module) 100 and a control board module 200.

The HDA module 100 includes, for example, two disks (magnetic disks) 110-1 and 110-2, a spindle motor (SPM) 130, an actuator 140 and a head integrated circuit (IC) 150.

Each of the disks 110-1 and 110-2 includes two recording surfaces on an upper side and a lower side. The disks 110-1 and 110-2 are quickly rotated by the SPM 130. A known recording format called constant density recording (CDR) is applied to a disk 110-$i$ ($i$=1, 2). Therefore, each recording surface of the disk 110-$i$ is separated into a plurality of zones based on a radius direction of a corresponding disk 110-$i$ and thereby is managed. That is, each recording surface of the disk 110-$i$ includes the plurality of zones.

The actuator 140 includes heads (magnetic heads) 120-0 and 120-1 in front ends of a head and an arm that are disposed in correspondence to the respective recording surfaces of the disk 110-1. The actuator 140 further includes heads 120-2 and 120-3 in front ends of the head and the arm that are disposed in correspondence to the respective recording surfaces of the disk 110-2. The heads 120-0 and 120-1 are used for recording/reading of data in/from the disk 110-1, and the heads 120-2 and 120-3 are used for recording/reading of data in/from the disk 110-2.

The actuator 140 includes a voice coil motor (VCM) 141. The actuator 140 is driven by the VCM 141, and moves the heads 120-0 to 120-3 into the radius direction of the disks 110-1 and 110-2.

The SPM 130 and the VCM 141 are driven by a driving current (SPM current and VCM current) that is supplied from a motor driver IC 210, which is described below.

The head IC 150 amplifies a signal (read signal) read by the head 120-$j$ ($j$=0, 1, 2, 3). The head IC 150 also converts write data, which is transmitted from read/write channel 230 as described below, to a write current, and outputs the converted write current to head 120-$j$.

The control board module 200 includes two large-scale integrations (LSIs), that is, a motor driver IC 210 and a system LSI 220. The motor driver IC 210 drives the SPM 130 at a constant rotation speed. The motor driver IC 210 also drives the actuator 140 by supplying the VCM 141 with a current (VCM current) of a value corresponding to a VCM control amount that is designated by a central processing unit (CPU) 270.

The system LSI 220 is an LSI called a System on Chip (SOC) in which a read/write channel (R/W channel) 230, a disk controller (HDC) 240, a buffer random access memory (RAM) 250, a flash memory 260, a program read only memory (ROM) 270, a CPU 280, and a RAM 290 are integrated on a single chip. A line cache area as described below can be embodied on a cache memory within, for example, the CPU 280 or the RAM 290.

The R/W channel 230 is a signal processing device that performs signal processing associated with read/write. The R/W channel 230 converts a read signal to digital data and decodes read data from the digital data. The R/W channel 230 also extracts, from the digital data, servo data that is required to determine a position of the head 120-j. The R/W channel 230 also encodes the write data.

The HDC 240 is connected to the host 20 via a host interface 21. The HDC 240 receives a command (a write command, a read command and the like) transmitted from the host 20. The HDC 240 controls a data transmission between the host 20 and the corresponding HDC 240. The HDC 240 controls a data transmission between the disk 110-i (i=1,2) and the corresponding HDC 240, which is performed via the R/W channel 230.

The buffer RAM 250 is used to temporarily store data that needs to be recorded in the disk 110-i, and data that is read via the head IC 150 and the R/W channel 230 from the disk 110-i.

The flash memory 260 is a nonvolatile memory enabling a rewrite. The flash memory 260 is used to temporarily store data of a fraction sector of a write command received from, for example, a host. A flag table 264 is a general purpose table within the flash memory 260.

The program ROM 270 pre-stores a control program (firmware program). The control program may be stored in a partial area of the flash memory 260.

The CPU 280 functions as a main controller of the HDD 10. The CPU 280 controls at least a portion of other elements within the HDD 10 according to the control program stored in the program ROM 270. A partial area of the RAM 290 is used as a work area of the CPU 280. A portion of data stored in the flash memory 260 is loaded to the work area when the HDD 10 is powered on.

Hereinafter, a purpose of the embodiment is described. Generally, in an iterative decoding scheme represented by a low-density parity-check (LDPC) code, a few sectors to tens of sectors of a decoding delay occurs until a desired sector is read and then a read channel transmits data to a hard disk controller (HDC). Accordingly, when continuously reading data present in another zone or cylinder, a controller needs to wait for a decoding delay until a seek for a subsequent destination position is initiated. Accordingly, a random read performance may be degraded. This is a method for improving a performance when reading data across a cylinder by performing an early seek without waiting. Meanwhile, when a retry is required due to, for example, an uncorrectable error, the seek should be performed again at a previous position. Therefore, even though performance degradation is predicted by the early seek, this circumstance may be prevented by including a module configured to select whether to perform the early seek using decoding quality information of a read channel.

(Configuration of Embodiment)

Figure 2:
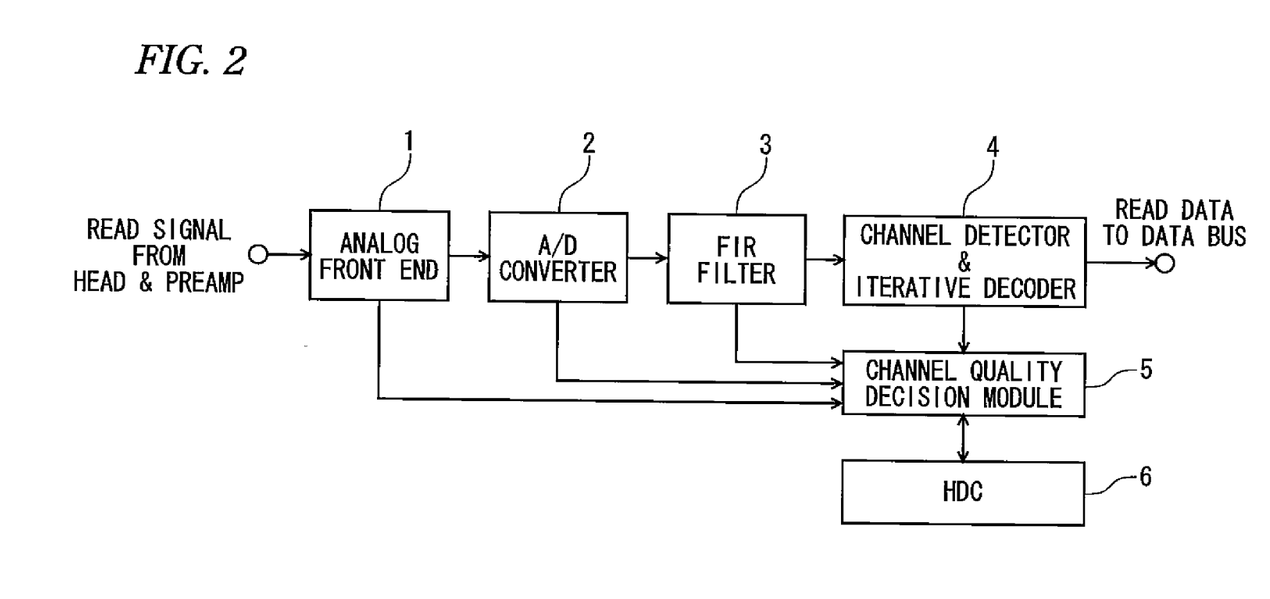
FIG. 2 is a block configuration diagram schematically illustrating major components of the embodiment.

FIG. 2 is a block configuration diagram schematically illustrating major components of the embodiment. The HDC 6 corresponds to a function of the HDC 240, and the other elements correspond to functions within the R/W channel 230. That is, FIG. 2 shows a configuration of an analog front end 1, an analog-to-digital (A/D) converter 2, a finite impulse response (FIR) filter 3, a soft output viterbi algorithm (SOVA) detector and iterative decoder 4, and a channel quality decision module (early decision module) 5.

The configuration of the present embodiment shown in FIG. 2 adds the channel quality decision module 5 to a related-art configuration and thereby connects an output thereof to the HDC 6.

A signal output from a head is processed by an analog circuit expressed as the analog front end 1, and a sample value quantized by the A/D converter 2 is equalized by FIR filter 3. The equalized sample is error corrected by iterative decoding through the SOVA detector and iterative decoder 4. The channel quality decision module 5 receives a monitor signal of each module of a read channel and outputs an early decision result to the HDC 6.

Figure 3:
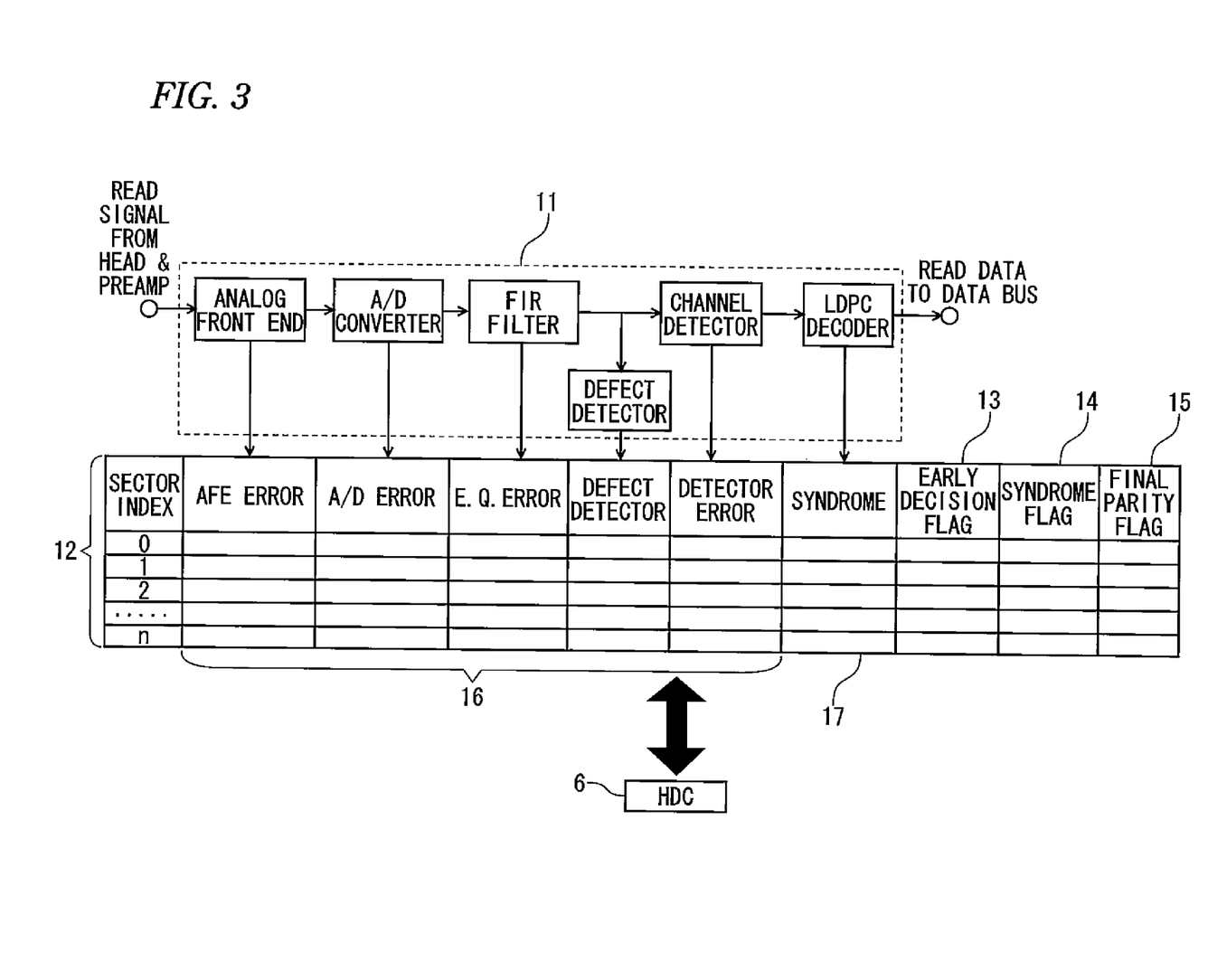
FIG. 3 is a functional configuration diagram illustrating an early decision module of the embodiment.

FIG. 3 shows a functional configuration of the early decision module 5. The early decision module 5 stores a monitor value obtained from each module of the read channel and a decision result within a memory (the number of parity violations of first decoding, likelihood information of the detector, an equalization error of an FIR output, no detection of a SYNC mark, a quantization error of the ADC, a phase-locked loop (PLL), an error signal of an analog portion, a defect detection, a final parity check result, etc.). This decision result is accessible from the HDC 6, and determines whether to perform an early seek.

A monitor value or an error signal is input from each module 11 of the read channel. The decision module includes a storage area such as reference numeral 12 and may maintain information over a few sectors being processed. User data read by the read channel is output to the HDC. That is, description is sequentially cleared from a process completed sector. AFE Error indicates a voltage abnormality and the like. A/D Error indicates an overflow and the like. E.Q. Error indicates an equalization error of a filter and the like. Defect Detect indicates an amplification error and the like. Detector Error indicates a divergence and the like. Syndrome indicates a parity violation and the like.

This decision module makes a decision with respect to three flags, an early decision flag of reference numeral 13, a syndrome flag of reference numeral 14, and a final parity check result flag of reference numeral 15. Reference numeral 13 makes a decision from information that is obtained from an analog module generally expressed by reference numeral 16, and stores a prediction about whether a read of a sector being currently processed is possible. Reference numeral 14 stores a prediction about whether a read from a syndrome of first LDPC decoding is possible. Reference numeral 15 performs a decision from whether a parity violation according to the final result of LDPC decoding exists and stores the result.

Figure 4:
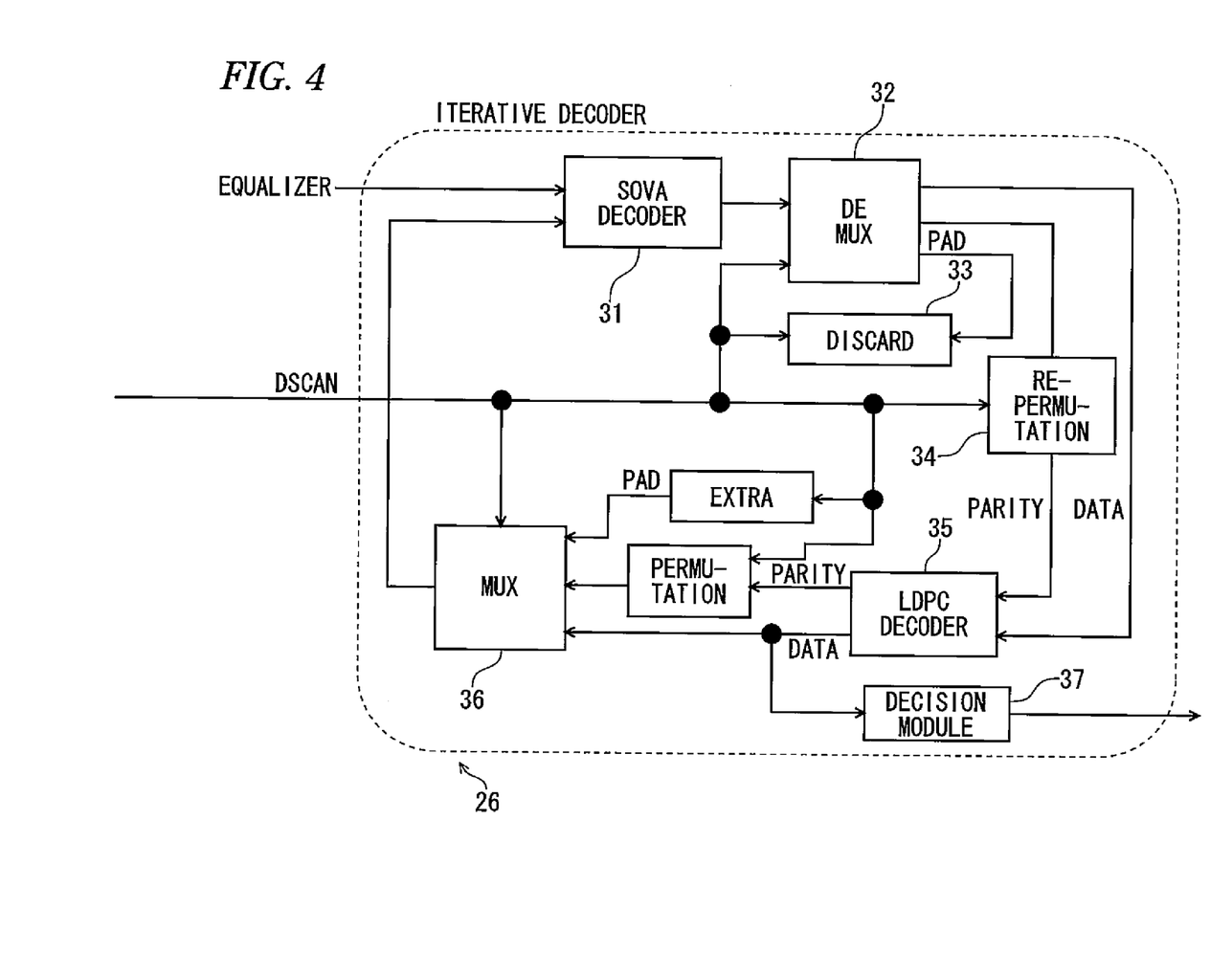
FIG. 4 is a block diagram illustrating an encoder and a decoder of the embodiment.

FIG. 4 is a block diagram illustrating an encoder and a decoder of the embodiment. FIG. 4 shows details of the SOVA detector and iterative decoder 4. In general, a decision signal of whether a sector to be processed is playable is configured to be output from an iterative decoder 26. A group of signals required for steps of FIG. 6 as described below is not illustrated herein, however, is obtained from each constituent element.

Although not essential in the present embodiment, FIG. 4 includes a function of permutation of parity bits to have the same cycle as data bits. When the number of '1's and the number of '0's are different, remaining bits are permutated in, for example, the last of the data bits. For example, when the number of '0's is large and the number of '1's is small, '1' bits are padded. When the number of '1's and '0's of the parity bits are different from each other in combining data bits and parity bits, extra pad bits are inserted in the permutated parity bits and multiplexed to have the same cycle as data bits.

When playing back a signal written in a medium, this signal is processed to an analog signal by an equalizer that is not shown and output in two directions. One is input into a defect scan circuit and a depression of a signal amplitude and the like is detected in the defect scan circuit. The other is input into the iterative decoder 26. Initially, in the iterative decoder 26, the signal passes a SOVA decoder 31 and is separated into data bits, parity bits, and extra pad bits by a demultiplexer 32.

The extra pad bits are discarded (33). Re-permutation of returning the parity bits to an original state is performed (34) and the parity bits are input into an LDPC decoder 35 together with the data bits, and LDPC decoding is performed. Further, the data bits, the permutated parity bits, and is the extra pad bits are combined by a multiplexer (MUX) 36 and are input into the SOVA decoder 31. Thus the iterative decoding is performed. A decision signal indicating whether a corresponding sector is playable or not is finally transmitted to a controller from a decision module. The controller performs a defect detection from results of two modules of the defect scan circuit and the iterative decoder 26.

(Operation According to the Related-Art Configuration)

Here, a case of reading data of Sector0 to Sector4 is assumed. In this instance, Sector0, 1, 2, and 3, and Sector4 exist in respective cylinders and thus, a seek operation is required therebetween.

An analog signal of each sector, an operation timing of a SOVA detector, an operation timing of an LDPC decoder, a parity check result of LDPC decoding, and an output of read user data become keys. In general, the HDC collects data of up to Sector3 and then, a seek for a cylinder of Sector4 is performed.

In the iterative decoding scheme, when the first decoding does not proceed, second, third, ... n-th iterative decoding is performed. For example, it is a case where Sector0 requires iterative decoding to be performed three times. Sector0 is NG in the first parity check, and second SOVA and second LDPC decoding is performed. Third decoding is further performed. Here, an operation timing depends on a configuration of the decoder. Meanwhile, each of Sector1 to Sector3 proceeds in the first decoding and thus, user data is in a transmission standby within the read channel. In this case, after the decoding procedure of Sector0 is terminated, the read channel sequentially outputs user data of Sector0 to Sector3 and a seek is initiated at a timing after the completion.

As described above, in the iterative decoding scheme, an inconsistent delay occurs in an interval from an analog input end to a data output. In particular, a performance may be degraded in a read accompanying a seek.

(Operation of the Embodiment)

Figure 5:
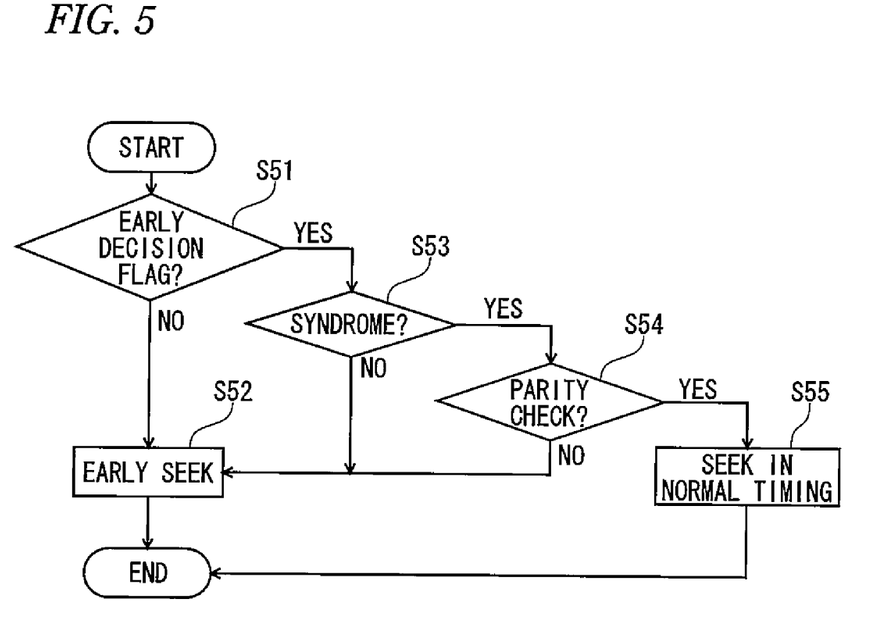
FIG. 5 is a flowchart illustrating a process after an early decision used for the embodiment.

FIG. 5 is a flowchart illustrating a process using, as an entity, early decision module 5 after the early decision used for the embodiment.

If an abnormality with respect to early decision flags of Sector0, 1, 2, and 3 is verified (step S51) and the early determination flags of Sector0, 1, 2, and 3 are all OK, a seek may be initiated immediately in an analog signal end of Sector3 later indicated (step S52). Even though early decision flags are NG, a syndrome abnormality is verified (step 53). When a read can be determined to be possible as the decision result, the seek may be initiated in a timing of FIG. 6 (step S52). Even though they are NG, an abnormality with respect to a parity check of all of sectors being processed is verified (S54). When the decision is set such that read is possible, the seek is initiated in the timing of FIG. 6 (step S52). In this case, a seek may be performed as early as the time amount of transmitting user data from the read channel. In another case, the seek is initiated in the normal timing (step S55).

Figure 6:
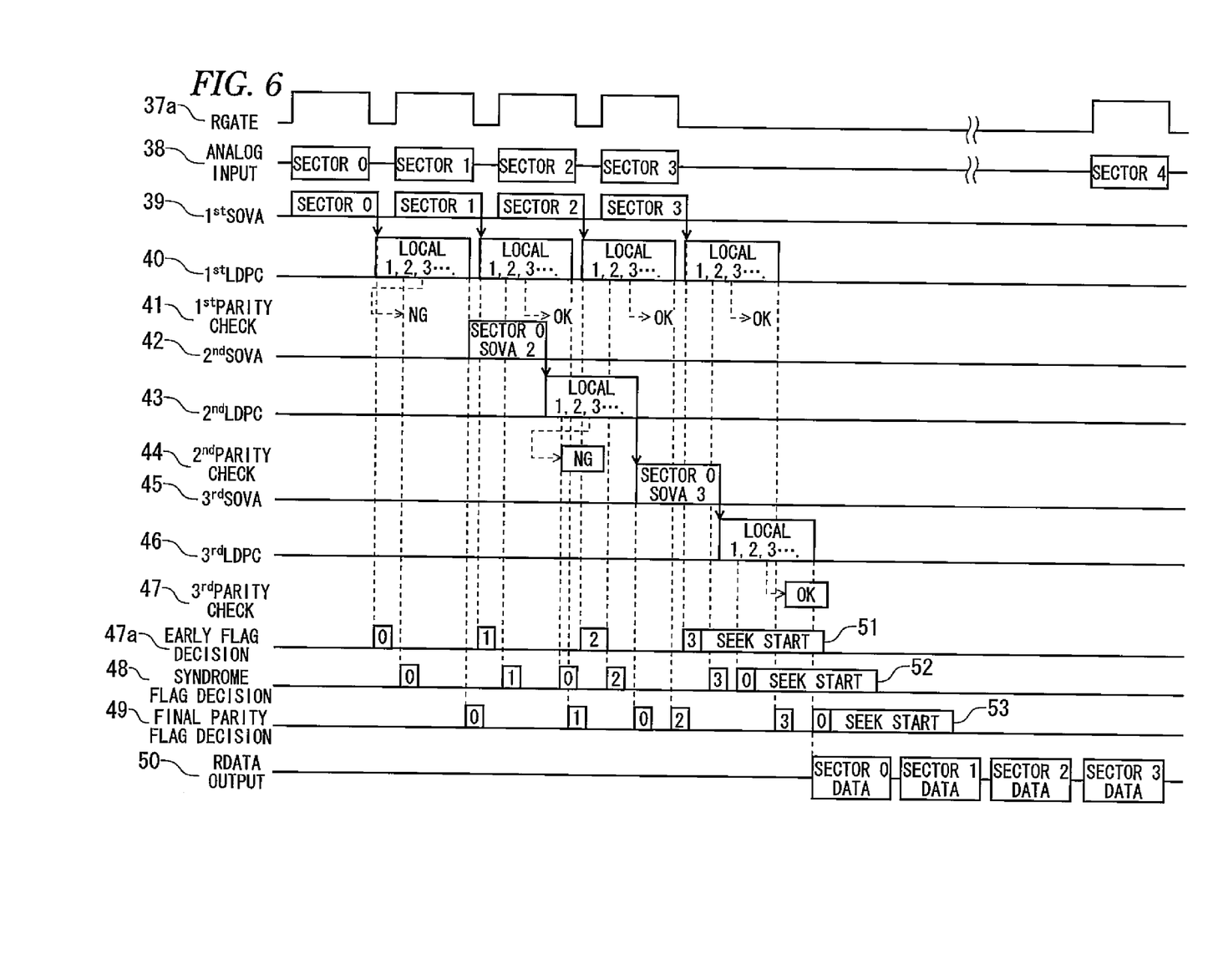
FIG. 6 is an explanation diagram illustrating an operation of the embodiment.

FIG. 6 illustrates an operation timing of the embodiment. Here, even a case where the first decoding same as the related-art example does not proceed is also assumed (37a-47).

An early decision expressed by reference numeral 47a is performed at the time when the first SOVA detection of each sector is completed. An early decision flag about a sector being processed from a boundary value decision of each monitor value expressed by reference numeral 16 or about whether an error of each module exists is maintained in reference numeral 13. A syndrome decision expressed by reference numeral 48 generates a flag using a syndrome of first LDPC decoding expressed by reference numeral 40 and maintains the flag in reference numeral 14. A final parity check flag expressed by reference numeral 49 corresponds to reference numeral 15, and generates and maintains a flag according to information from the decoder when each LDPC decoding is terminated.

If all of early decision flags of Sector0, 1, 2, and 3 are OK, a seek may be initiated immediately in an analog signal end of Sector3 expressed by reference numeral 51. Even though early decision flags are NG, a read can be determined to be possible as a result of a syndrome decision. In this case, the seek may be initiated in a timing expressed by reference numeral 52. Even though the early signal flags are NG in reference numerals 47a and 48, a parity check decision with respect to all of the sectors being processed are set such that read is possible. In this case, the seek is initiated in a timing of reference numeral 53. In this case, a seek may be performed as early as the time amount of transmitting user data from the read channel.

By initiating the early seek as described above, it is possible to move to a read of Sector4 quickly as compared to the related-art method. Thus, it is possible to improve the performance of a read operation accompanying a seek such as a random read.

As described above, the present embodiment employs a method of aiming to improve the performance by applying a decoding delay time by an iterative decoder to a seek.

(1) A method of early predicting whether a read is possible without waiting for data and immediately initiating a seek.

(2) A method of early predicting whether a read is possible before iterative decoding is terminated.

As the effect of the above methods, it is possible to perform an early seek in a read position of a subsequent sector and thereby quickly perform reading of the subsequent sector as compared to the related art. Accordingly, it is possible to improve performance degradation occurring due to a decoding delay when reading a sector in another cylinder through continuous reads. Further, it is possible to prevent a retry of a seek by not performing an early seek when the retry is predicted to occur by early predicting whether a read is possible.

The present embodiment is a method of performing an early seek at a point in time of an analog input end by a read. Further, the early seek is performed according to an error prediction.

The present method is a method of performing an early seek without waiting and thereby improving the performance of when performing a read over a cylinder. Meanwhile, when a retry is required due to an uncorrectable error and the like, the seek should be performed again at a previous position. Therefore, even though performance degradation by the early seek is predicted, this circumstance may be prevented by including a module to select whether to perform the early seek using decoding quality information of a read channel.

The present invention is not limited to the embodiment and may be variously modified without departing from the spirits of the invention and thereby be implemented.

Various inventions may be formed through appropriate combinations of a plurality of constituent elements disclosed in the embodiment. For example, a few constituent elements may be deleted from all of the constituent elements disclosed in the embodiment. Constituent elements according to various embodiments may be appropriately combined.

What is claimed is:

1. A channel circuit comprising:
a reader configured to read data written in a medium;
a decoder configured to perform iterative decoding of the read data;
a prediction module configured to predict whether an early read is possible before the iterative decoding is terminated; and
a seek module configured to initiate a seek when the prediction module predicts that the early read is possible.

2. A channel circuit comprising:
a reader configured to read data written in a medium;
a decoder configured to perform iterative decoding of the read data;
a prediction module configured to predict whether an early read is possible without waiting for arrival of the read data before the iterative decoding is terminated; and
a seek module configured to initiate a seek when the prediction module predicts that the read is possible.

3. The channel circuit of claim 2, wherein the prediction whether the early read is possible is based on an early decision flag that indicates a decision based on information from an analog module of a read channel associated with the reader.

4. The channel circuit of claim 2, wherein the prediction whether the early read is possible is based on syndrome information that indicates a decision based on a syndrome of first low density parity check decoding from the decoder.

5. The channel circuit of claim 2, wherein the prediction whether the early read is possible is based on parity check information that indicates a decision from whether a parity violation exists according to a final result of low density parity check decoding from the decoder.

6. The channel circuit of claim 1, wherein the prediction whether the early read is possible is based on an early decision flag that indicates a decision based on information from an analog module of a read channel associated with the reader.

7. The channel circuit of claim 1, wherein the prediction whether the early read is possible is based on syndrome information that indicates a decision based on a syndrome of first low density parity check decoding from the decoder.

8. The channel circuit of claim 1, wherein the prediction whether the early read is possible is based on parity check information that indicates a decision from whether a parity violation exists according to a final result of low density parity check decoding from the decoder.

9. A seek method comprising:
reading data written in a medium;
performing iterative decoding of the read data;
predicting whether an early read is possible before the iterative decoding is terminated; and
initiating a seek when the earl read is predicted to be possible.

10. The seek method of claim 9, wherein the prediction whether the early read is possible is based on an early decision flag that indicates a decision based on information from an analog module of a read channel associated with the reader.

11. The seek method of claim 9, wherein the prediction whether the early read is possible is based on syndrome information that indicates a decision based on a syndrome of first low density parity check decoding from the decoder.

12. The seek method of claim 9, wherein the prediction whether the early read is possible is based on parity check information that indicates a decision from whether a parity violation exists according to a final result of low density parity check decoding from the decoder.

* * * * *